(12) United States Patent
Frohs et al.

(10) Patent No.: US 8,748,009 B2
(45) Date of Patent: Jun. 10, 2014

(54) MATERIAL, METHOD FOR PRODUCING A MATERIAL AND USE THEREOF

(75) Inventors: Wilhelm Frohs, Allmannshofen (DE); Andreas Kienzle, Möttingen (DE); Ingrid Krätschmer, Biberbach (DE)

(73) Assignee: SGL Carbon SE, Wiesbaden (DE)

( * ) Notice: Subject to any disclaimer, the term of this patent is extended or adjusted under 35 U.S.C. 154(b) by 238 days.

(21) Appl. No.: 12/898,199

(22) Filed: Oct. 5, 2010

(65) Prior Publication Data

US 2011/0082033 A1    Apr. 7, 2011

(30) Foreign Application Priority Data

Oct. 6, 2009   (DE) .......................... 10 2009 048 424

(51) Int. Cl.
| | |
|---|---|
| B32B 9/00 | (2006.01) |
| B32B 19/00 | (2006.01) |
| B32B 9/04 | (2006.01) |
| C04B 35/52 | (2006.01) |
| C04B 35/56 | (2006.01) |

(52) U.S. Cl.
USPC ................ 428/688; 428/704; 501/90; 501/99

(58) Field of Classification Search
USPC .............. 428/688, 689, 704; 501/90, 99, 100, 501/101; 508/107, 109; 264/692, 29.1
See application file for complete search history.

(56) References Cited

U.S. PATENT DOCUMENTS

| | | | | |
|---|---|---|---|---|
| 5,326,732 | A * | 7/1994 | Ogawa ............................ | 501/90 |
| 5,536,292 | A * | 7/1996 | Holcombe et al. ................ | 65/23 |
| 5,538,649 | A * | 7/1996 | Demendi et al. ............. | 508/101 |
| 6,576,132 | B2 * | 6/2003 | Kurukchi et al. ............. | 210/634 |
| 6,716,800 | B2 * | 4/2004 | Demendi et al. ............. | 508/107 |
| 2006/0019816 | A1 * | 1/2006 | Lynen et al. .................... | 501/90 |

* cited by examiner

*Primary Examiner* — Noah Wiese
(74) *Attorney, Agent, or Firm* — Taylor IP, P.C.

(57) ABSTRACT

The present invention relates to a material including a matrix and at least one reinforcing element introduced therein, wherein the matrix is selected from the group consisting of plastic, carbon, ceramic, glass, clay, metal, and combinations thereof, and the reinforcing element is spherical to ellipsoidal in shape and has an onionskin-like structure. The present invention further relates to a method for producing a material including steps preparing at least one spherical to ellipsoidal reinforcing element having an onionskin-type structure, and introducing the reinforcing element into a matrix, wherein the matrix is selected from the group consisting of plastic, carbon, ceramic, glass, clay, metal, and combinations thereof. The present invention further relates to use of the material in a friction application, as abrasion protection, an injection molding part, a support plate, catalyst substrate or as bone replacement material.

11 Claims, 2 Drawing Sheets

MATERIAL, METHOD FOR PRODUCING A MATERIAL AND USE THEREOF

BACKGROUND OF THE INVENTION

1. Field of the Invention

The present invention relates to a material, a method for producing a material, and use thereof.

2. Description of the Related Art

Materials for components such as ceramic are known. However, one disadvantage that is generally shared by ceramic materials is that they are brittle when exposed to mechanically and thermally induced loads. This significantly limits the range of uses to which they can be put. The impact resistance of silicon carbide is therefore improved as a matter of routine in industry, for example, by adding carbon fibers or ceramic fibers. The drawbacks of these materials are the high cost of the fibers and a complicated production process, which prevent the material from being used more widely in industry, and particularly in motor vehicles.

What is needed in the art is a material that is not brittle and which may be manufactured easily and inexpensively.

SUMMARY OF THE INVENTION

The present invention provides a material that includes a matrix and at least one reinforcing element. The matrix is selected from the group consisting of plastic, carbon, ceramic, glass, clay, metal, and combinations thereof. The reinforcing element has a spherical or ellipsoidal shape and is constructed in the manner of an onionskin. For purposes of the present invention, the term "onionskin construction" is used to refer to a multilayer construction having an inner layer of spherical to ellipsoidal shape, which is entirely or partially covered by at least one intermediate layer and an outer layer. The term "multilayer construction" means that the reinforcing element has at least three layers, that is to say an inner layer, an outer layer, and at least one intermediate layer, the intermediate and outer layers at least partially enclosing the inner layer.

The matrix is, for example, perfused evenly with the reinforcing element. The perfusion of the matrix with at least one spherical to ellipsoidal reinforcing element constructed in the form of an onionskin results in a material having improved fracture toughness, as well as good strength and rigidity. Moreover, costs for fiber-reinforced materials may be reduced due to the lower costs of raw materials and the possibility of employing mass moulding processes such as injection moulding, slip casting or extruding. These moulding methods are ideal because of the excellent flowability of the mass, which may be observed particularly in the addition of spherulitic particles.

The materials for the matrix and the reinforcing element are selected in such manner that the reinforcing element is not totally damaged or destroyed by the matrix when the material is processed, nor when it is used. The material of the matrix and the material of the reinforcing element may be selected such that they are non-reactive with regard to each other. The reinforcing element may also be pretreated with a medium that functions as protection from the matrix (coating).

In a first embodiment of the present invention, the matrix is a plastic, a carbon, a ceramic, a glass, a clay, a metal, or a combination of ceramic and metal.

In a second embodiment of the present invention, the matrix is a plastic. An example of such a plastic is polystyrene, in which case the material according to the present invention has good toughness. In a third embodiment according to the present invention, the matrix is constituted from a carbonizable plastic, for example a binder, as a carbon-containing binding agent from the group of synthetic resins. An exemplary binder from the group of synthetic resins is a phenolic resin, for example Novolak™. However, other resins that provide a good coke yield upon carbonization, such as furan resins, polyimides or polyarylate resins, for example polyphenylenes, are also suitable for use as the matrix. The matrix made from a synthetic resin may be transformed into a carbon matrix by carbonization.

In a fourth embodiment of the present invention, the matrix consists of carbon, for example a non-graphitic, that is to say brittle, carbon. The material may also have a matrix that consists of a combination of carbon and plastic. A material with such a matrix may be obtained by incomplete carbonization of the synthetic resin.

In a fifth embodiment, the matrix is a ceramic. For purposes of the present invention, the term "ceramic" is understood to mean a ceramic material including non-oxide ceramics, oxide ceramics, ceramic polymers and cements. The ceramic is, for example, a non-oxide ceramic such as silicon carbide. A material that is reinforced with coke particles and has a matrix of silicon carbide has outstanding hardness and resistance to chemicals, oxidation and heat. Such a material is obtained by introducing coke as a reinforcing element into a matrix of synthetic resin, such as phenolic resin for example, which is carbonized, possibly treated at graphitizing temperatures, and then siliconized. The matrix may thus also include a combination of carbon and silicon carbide.

In a sixth embodiment of the present invention, the matrix is an oxide ceramic. Examples of suitable oxide ceramics are, for example, silicon oxide, aluminum oxide, zirconium oxide, and mixed oxides, which may contain magnesium oxide, titanium oxide or boron oxide, as well as the oxides identified above.

In a seventh embodiment of the present invention, the matrix is a ceramic polymer. Suitable polymers are, for example, polymer compounds of silicon, boron and/or phosphorus, such as polysiloxanes, polysilanes, polysilizanes, polyboronitrides, polyphosphates or polyphosphazenes.

In an eighth embodiment of the present invention, the matrix includes a ceramic based on pyrolysis (thermal decomposition of the polymer in the absence of air) of an inorganic polymer. An example of such is the matrix constituted of SiBCN, which is obtained by pyrolyzing a polysilazane containing boron in nitrogen at temperatures up to approximately 1000° C. A material with such a matrix is thermally stable, and resistant to oxidation and corrosion.

In a ninth embodiment of the present invention, the matrix is constituted of cement. For purposes of the present invention, the term "cement" is also understood to mean concrete. For example, Portland cement is suitable for use as a matrix. Blast furnace cement consisting of approximately 15 to 69 parts by weight Portland cement and approximately 31 to 85 parts by weight slag sand, and iron Portland cement containing at least approximately 70 parts by weight Portland cement and up to approximately 30 parts by weight slag sand are suitable, wherein slag sand is understood to be a silicate product obtained by rapidly cooling blast furnace slag. High-alumina cement is also suitable for use as a matrix.

In a tenth embodiment of the present invention, the matrix is a metal. Examples of metals for this purpose are aluminum or magnesium.

In an eleventh embodiment according to the present invention, the matrix includes a combination of ceramic and metal. The metal is selected from the group consisting of aluminum, iron, chromium, nickel, copper, titanium, zirconium, molybdenum, vanadium, tungsten, tantalum, niobium, and the alloys bronze and brass. The ceramic is represented by an oxide ceramic such as aluminum oxide, zirconium oxide, a mixed oxide of two or more from the group of aluminum oxide, zirconium oxide, silicon oxide, titanium oxide, magnesium oxide and boron oxide. Alternatively, the ceramic may be represented by a non-oxide ceramic such as silicon carbide. The mass fraction of the metal in the ceramic is in the range from approximately 2 to 20%, for example from approximately 5 to 10%.

In a twelfth embodiment of the present invention, the matrix is constituted of a glass. For purposes of the present invention, a glass is understood to be a silicate that is represented by an amorphous, that is to say solidified without crystallizing, that is to say metastable, undercooled melt that only gradually softens upon heating. Materials of such kind that are suitable for use a matrix are silicate glass, borosilicate glass, aluminosilicate glass or phosphosilicate glass. Quartz glass is, for example, suitable as a matrix.

In a thirteenth embodiment according to the present invention, the matrix is clay. Examples of a suitable clay are loam or a baked clay product. This material according to the present invention is stronger and more resistant to crack formation than a pure clay.

The reinforcing element is, for example, selected from the group consisting of carbon, ceramic, a combination thereof, and in combination with metal. The reinforcing element may, for example, consist of carbon.

The reinforcing element is constructed like an onionskin and has at least three layers. At least the intermediate and outer layers of the reinforcing element are, for example, selected such that they are inert with regard to the matrix and they completely enclose the core material in the form of the inner layer if the core material is reactive to the matrix. The intermediate and outer layers then serve as an enclosure for the core material of the reinforcing element and provide protection, particularly when it is important to prevent a possible reaction between the core material and the matrix. The inner, outer and at least one intermediate layer may all include different materials. Alternatively, the inner, outer, and at least one intermediate layer may be constructed from the same material, for example carbon.

In a fourteenth embodiment of the present invention, the reinforcing element is coke, which is present in spherulitic form with an onionskin structure. The onionskin-type or layered reinforcing element includes layers of carbon. The reinforcing element is, for example, constituted of coke, which is poorly graphitizable, if at all, highly isotropic, hard and of low porosity, and has a low specific surface area. The average inter-layer distance $d_{002}$ of coke, as determined by X-ray diffraction, is, for example, at least 0.35 nm, and the apparent stack height $L_c$ is, for example, less than 5.0 nm. A coke of such kind is obtainable from crude oil fractions or steam cracking residues that are used to quench reaction gas in the synthesis of unsaturated hydrocarbons (acetylene), wherein the quench oil/carbon black mixture is diverted to a coker that is heated to about 500° C.

Volatile components of the quench oil evaporate in the coker and the coke may be recovered from the bottom thereof. In this way, a fine-grained coke with an onionskin-like structure is obtained which, besides the properties described above, is extremely pure and has little to no ash or mineral content. However, the coke may also have high ash and mineral content and be less pure. The purity of the coke depends on the purity of the quench oil used.

Coke is normally a solid having a high carbon content and in the non-graphitic state and is produced by pyrolyzing organic material that has at least partially passed through a liquid or liquid-crystalline state during the carbonization process. The carbon black particles presumably prevent a completely liquid phase (mesophase) from being formed and produce a coke that is very hard and poorly graphitizable. Consequently, the coke obtained from the gas quenching process is only poorly graphitizable with heat treatment at temperatures above approximately 2200° C. For example, after heat treatment at 2800° C. the inter-layer distance $d_{002}$ calculated from the X-ray diffraction peak is c/2 approximately 0.34 nm or more and the crystallate size $L_c$ in the c direction is less than approximately 20 nm, while the crystallate size $La_{110}$ is less than approximately 50 nm, for example less than approximately 40 nm. The coke may have a high hardness, be poorly graphitizable, and the average inter-layer distance c/2 after heat treatment at about 2800° C. is equal to or greater than approximately 0.34 nm, which is a graphitization degree referring to Maire and Mehring of approximately 46.5% at most.

Alternatively, the reinforcing element has at least three ceramic layers. For example, the reinforcing element may include aluminum oxide. Onionskin-type aluminum oxide in a spherical to ellipsoidal form may be obtained by partially encasing an aluminum oxide grain in additional aluminum oxide layers.

As a further alternative, the reinforcing element may include a combination of carbon and ceramic. For example, the inner layer of the reinforcing element may be constituted of carbon, and the at least one intermediate and outer layers may include carbon and silicon carbide. Or the reinforcing element may include a combination of carbon and silicon dioxide. As a further alternative, the reinforcing element may also include a metal in addition to carbon and/or ceramic. Examples of such metals include aluminum, iron, chromium or nickel.

The layered construction of the reinforcing element may also include at least one reinforcing component in its structure. An example of this is embedding of carbon black particles, such as are unavoidably produced during acetylene synthesis. An alternative to a coke from acetylene synthesis are the spheroid coke particles from the fluid/flexicoking process. In this case too, the cokes produced are hard and poorly graphitizable, and the X-ray parameters defined in the preceding are true for these as well.

In a further embodiment of the material according to the present invention, the reinforcing element is represented by coke and the matrix includes silicon carbide. For example, the matrix consists of silicon carbide and the at least one reinforcing element introduced into the matrix is spherulitic coke.

In an additional embodiment of the present invention, the reinforcing element has a length/diameter ratio of approximately 1 to 10, for example of 1 to 5, or of 1 to 3. The more closely the shape of the reinforcing element approximates a sphere, the better are the flowability of the mass and the mechanical properties of the material.

Further, the reinforcing element may be thermally pretreated. Thermal pretreatment is useful if the reinforcing element includes carbon (coke). Thermal pretreatment includes calcination, that is to say heat treatment of the reinforcing element at a temperature in the range between approximately 700 and 1600° C., for example between approximately 1000 and 1500° C., or between approximately 1100 and 1300° C., which is possible in a reducing atmosphere. Such a treatment particularly causes water, volatile combustible substances, for example hydrocarbons such as methane, carbon monoxide and hydrogen, to evaporate.

The reinforcing element may further be pretreated with an oxidation protection agent. Oxidation protection is useful if the reinforcing element is a material that is susceptible to oxidation. Oxidation protection agents that may be considered are compounds that are more readily oxidized than the reinforcing element. For example, in the case of carbon (coke) as the reinforcing element, the following oxidation protection agents may be considered. Boron salts may be embedded in the coke and the coke may be pretreated, additionally or instead, with silicon compounds that form silicon dioxide skins.

The reinforcing element may also be pretreated by impregnation. The impregnation envelops the reinforcing element and functions as a protection against possible reactions between the reinforcing element and the components of the matrix. The reinforcing element may also be anodized.

In a further embodiment of the present invention, the matrix also includes at least one filler material. That is to say, besides the spherical or ellipsoidal reinforcing element with the onionskin-type structure, the matrix is also perfused with at least one filler material. The filler material may be a fiber. The fiber may be present as long fibers in the form of a mat, a strip, a woven fabric, a warp-inserted or knitted fabric, a non-woven fabric, or as short fibers. In addition or instead, the filler material may consist of spherical or ellipsoidal particles. For example, the filler material may be selected from the group consisting of carbon black, zirconium oxide, silicon dioxide, aluminum nitride, aluminum oxide, titanium dioxide, titanium carbide, tungsten carbide, and mixtures thereof. For example, the material according to the present invention may include a carbon fiber filler material, spherulitic coke as the reinforcing element, and a matrix made from a carbonized phenolic resin such as Novolak™, that is to say a carbon matrix. In the desired geometry and dimensions, it is suitable for use as a brake disc.

The grain size of the reinforcing element influences the density, strength, absorption capacity of the matrix and the fracture energy of the material. In an embodiment of the present invention, the grain size of the reinforcing element is at least 1 μm. The grain size is, for example, in the range from 5 μm to 500 μm. The grain size of the reinforcing element may further be in the range from 10 to 125 μm or in the range from 10 to 60 μm. The finer the grain in the reinforcing element, the greater are the strength and density of the material. The desired grain size for the reinforcing element may be obtained, for example, by sieving the reinforcing element.

The material may consist of approximately 30 to 95% by weight, for example 50 to 90% by weight, or 75 to 60% by weight reinforcing element and approximately 5 to 70% by weight, for example 10 to 50% by weight, or 25 to 40% by weight matrix, relative to the total weight of the material. Optionally, the material may also include up to approximately 40% by weight filler material relative to the total weight of the material.

A method for producing the material according to the present invention includes the following steps:
 a) preparing at least one spherical to ellipsoidal reinforcing element having an onionskin-type structure; and
 b) introducing the reinforcing element into a matrix, the matrix being selected from the group consisting of plastic, carbon, ceramic, glass, clay, metal, and combinations thereof.

The introduction of at least one spherical to ellipsoidal reinforcing element having an onionskin-type structure into a matrix results in the creation of a material of high strength and fracture toughness. The starting mass is also very plastic. The method by which the reinforcing element is introduced into the matrix depends on the nature and type of the matrix and the reinforcing element. It may be introduced by infiltration, high pressure die casting, impregnation with the reinforcing element, or mixing the matrix and the reinforcing element together. The reinforcing element may, for example, be mixed with the matrix if good adhesion exists between the material of the reinforcing element and that of the matrix. Infiltration is also useful if the matrix is made from a metal or if the matrix is an inorganic resin such as a polymer that is capable of being pyrolized. For purposes of the present invention, high pressure die casting is understood to mean infiltration under pressure. Impregnation with the reinforcing element is useful if the reinforcing element is a polymer, a plastic or a resin.

Hot impact extrusion is also useful if the reinforcing element is coke, wherein the coke is mixed with a synthetic resin such as Novolak™ and undergoes a hot impact extrusion or injection moulding process. The synthetic resin may then be carbonized to form a carbon matrix. Then, the material that encloses the carbon matrix and the coke reinforcing element may undergo siliconization to form a silicon carbide matrix. The reinforcing element may then be introduced into the matrix at room temperature or at higher temperature, with or without increased pressure.

The matrix into which the reinforcing element is introduced is, for example, moulded during step b) of the method according to the present invention. For example, a mass of matrix and reinforcing element may be moulded into any shape in a hot impact extruder. Because of the spherical to ellipsoidal shape of the reinforcing element, a moulding material that lends itself well to shaping with the matrix is obtained. The mass may be made flowable at low pressures and the application of some heat.

In a further embodiment of the method according to the present invention, step b) includes introducing at least one reinforcing element and at least one filler material into the matrix. A fiber such as carbon fiber or a spherical to ellipsoidal particle such as carbon black, zirconium oxide, silicon dioxide, aluminum nitride, aluminum oxide, titanium oxide, titanium carbide, tungsten carbide, or mixtures thereof may be used as the filler material. In this embodiment, the at least one reinforcing element is introduced into the matrix together with the at least one filler material. All starting substances of the material according to the present invention may be mixed. In another embodiment of the method according to the present invention, spherulitic coke as the reinforcing element and carbon fibers as the filler material are mixed with a phenolic resin such as Novolak™.

In another embodiment, the method according to the present invention also includes step c) creating a porosity at least on the surface of the material, following step b). With this step, the material according to the present invention is given a defined porosity. Accordingly, the method is capable of producing not only a non-porous material, but also a porous material, which may be used as a component that requires a support structure. For example, the material according to the present invention may have a defined porosity on the surface thereof if it is to be used as a catalyst substrate, such as a soot particle filter. This variation of the performance of the method also offers particular advantages when the inventive material is used as a bone replacement material because bone cells may be embedded in the pores so that they are able to grow in a desired three-dimensional structure defined by the material according to the present invention if they are implanted in the body of a patient together with the material. In this case, the porosity may not only be created on the surface of the material, but the entire material may be made porous. In this way, a material may be constructed as a three-dimensional support framework, throughout which cells and vessels may grow when it has been implanted in a patient's body. For example, a defined porosity may be created in the inventive material that includes silicon dioxide as the matrix and coke as the reinforcing element by oxidizing coke grains on the surface of the material with air. Oxidation of the material proceeds at highly controllable, defined rates. In this context, the size and distribution of the pores are determined by the sizes and quantities of the coke grains used.

In a further embodiment, the reinforcing element used in the method according to the present invention has the following properties: its length/diameter ratio is approximately 1 to 10, its grain size is greater than 1 μm, and its material is constituted of carbon, ceramic or a combination thereof and combined with metal. In the method according to the present invention, spherulitic coke as the reinforcing element may be used.

In a further embodiment, step b) of the method according to the present invention includes the steps of mixing the reinforcing element with a binder, carbonizing the binder, and optionally siliconizing and reacting the carbon matrix formed by carbonization of the resin to yield silicon carbide. In this embodiment, the at least one reinforcing element is, for example, represented by spherulitic coke.

Carbon-containing binding agents from the group of synthetic resins may be used as the binder. Phenolic resin is an exemplary binder from the group of synthetic resins. Novolak™ is an exemplary phenolic resin. However, other resins that provide a good coke yield upon carbonization, such as furan resins, polyimides or polyarylate resins or, for example, polyphenylenes, may also be used.

In order to produce a plastic mass from the reinforcing element and the binder, approximately 30 to 95% by weight, for example 50 to 90% by weight, or 75 to 60% by weight reinforcing element is mixed with approximately 5 to 70% by weight, for example 10 to 50% by weight, for example 25 to 40% by weight binder, for example at room temperature. Upon completion of the mixing process, which may take up to 30 minutes, the mixture is deposited in the moulding or pressing form of an isostatic press where it is compressed and hardened as necessary. The pressing force exerted on the mass is, for example, approximately 0.1 to 5.0 MPa, or 0.5 to 4.0 MPa. The time required for hardening, for which the press pressure is also maintained, depends on the size of the moulded part that is to be produced and on the synthetic resin used. For binder resins, the hardening process generally lasts from 30 minutes to 5 hours.

After hardening, the shaped item is removed from the mould and carbonized. The final temperature applied may be in the range from approximately 850° to 950° C. As in all carbonization or firing steps of this production method, measures should be implemented to guarantee that the material being fired is completely insulated from all oxidizing substances. In this case, the firing process is conducted so that a high carbonization rate is obtained from the binder or binder system. This is made possible by using a pressure coking method or by keeping the temperature gradient low during heating in the range from about 300 to 600° C., for example at less than 4° C. per hour.

In order to optimize the elongation at fracture of the end product of this production method, a graphitizing step after this carbonization process may be added. However, this is not absolutely essential, and may be omitted if necessary for financial reasons. Graphitizing methods are known. The process may be carried out at temperatures between approximately 1800 and 2200° C.

In a further embodiment of the method according to the present invention, the material is then subjected to siliconization and the carbon matrix produced by carbonization of the resin is reacted to give silicon carbide. This results in a very strong silicon carbide component having excellent fracture toughness. To achieve this, the process of siliconizing with liquid silicon known from the related art may be used. In this inventive method, the item to be siliconized is placed in a receptacle, the bottom of which contains molten silicon. Because of its excellent crosslinking capability with carbon, the silicon infiltrates the matrix of the material by capillary action and reacts with the carbon to produce silicon carbide. With sufficiently high temperatures, in the range of about 2200° C., and sufficiently long residence times, and in the presence of sufficient quantities of silicon it is possible to convert all of the carbon into SiC. However, it should be noted that graphitic, very highly organized carbon are converted into SiC more slowly than those that are less well organized from a crystallographic point of view, such as carbon that has been fired but not graphitized. If the reinforcing element of the material is coke, the conditions under which this inventive method step is performed must therefore be chosen such that essentially only the matrix is converted to silicon carbide, and the reinforcing element is essentially not converted at all.

Siliconization may be performed in a temperature range from approximately 1450 to 2200° C. However, the process may be conducted in a vacuum in a temperature range from about 1500 to 1750° C., in which case the vessel or furnace used for siliconizing may be flushed with an inert gas, for example argon, before the process is started so that any remaining reactive gases are removed. The reactor is able to be heated to the reaction temperature quickly depending on the technical conditions that apply to the siliconization plant. Once the siliconization temperature has been reached, the time required for infiltration ad reacting to form SiC is 10 minutes to 1 hour. An impregnation and reaction time may, for example, be 0.5 hour. The impregnation and reaction times indicated allow economical application of the inventive method. Where necessary due to local conditions, times may be extended. Siliconization may also be carried out without a vacuum. In this case, siliconization should be conducted at temperatures from 2100 to 2200° C., but still using a buffer gas. Here too, the total infiltration and reaction time is between 10 minutes and one hour, for example 0.25 hour. For siliconizing, the "wicking technique" may be utilized. In this case, the items to be siliconized are arranged on porous carbon elements that are much more absorbent than the silicon, and which are standing in liquid silicon. The silicon then rises through these wicking bodies into the items to be siliconized while the items themselves do not come into direct contact with the silicon bath. This process avoids expensive cleaning work after the siliconization process.

The inventive method is suitable for producing a material, wherein the step of creating a defined porosity may optionally be carried out afterwards. The material according to the present invention includes, for example, approximately 10 to 50% by weight silicon carbide as the matrix and approximately 50 to 90% by weight coke as the reinforcing element relative to the total weight of the material.

The material according to the present invention is inexpensive and the inventive method enables the inventive material to be mass produced. The inventive material may also be manufactured in a wide variety of complex geometries and with any wall thickness and is thus suitable for an enormous range of applications. The material according to the present invention is suitable, for example, for use in friction applications, abrasion protection, refractory applications, substrates, injection moulding parts, catalyst substrates or as a bone replacement material.

Use of the material according to the present invention in a friction application offers certain advantages. In a friction application, the inventive material may be used as a brake lining. Alternatively, it may also be used as a brake disc. A brake lining or brake disc may be mass produced inexpensively for use in machines or vehicles such as cars via the method according to the present invention. A brake lining or brake disc made from the material according to the present invention may also be incorporated in an elevator emergency system, for example.

The material according to the present invention is also suitable for use as abrasion protection since it is extremely resistant to wear. The abrasion protection may be included as a lining for a pipe, a cyclone or an exhaust system. In this case, the ability to produce the material in the form of a very strong, very thin part having any wall thickness also renders it suitable for use as a shelf plate or protective panel. Because of the high thermal resistance of the material according to the present invention, it is also suitable for use as a plate with complex geometry in high temperature applications. The inventive material is also suitable for use as abrasion protection in the form of a nozzle, such as a sand blasting nozzle or rocket nozzle.

The material according to the present invention may also be used as a substrate and be manufactured as a component having any wall thickness. It is very strong and heat-resistant and, therefore, suitable for use, for example, as a substrate in furnace processes.

The material according to the present invention also offers advantages when used as an injection moulded part. In this context, it may be used for components having any geometry and wall thickness. Because of its high resistance to wear and heat, the following uses are of particular interest. It is usable as an engine part, such as an O-ring, slide ring or bearing race. Since the material according to the present invention is highly plastic, and is thus able to be shaped into extremely complex geometries, it may also be used for an engine block, a cylinder liner or a piston. For this, the material may still be cast into a metal such as aluminum or magnesium, or it may be infiltrated thereby. It may also be used for a pump housing because it is extremely resistant to wear. The material's properties even allow it to be used as a spring, a turbine blade, for example in a ventilation system in case of fire, or a turbocharger. Because of its high strength and thermal and chemical resistance, the material according to the present invention is also usable to advantage as a pipe, distillation column, exhaust system, manifold or valve. If the inventive material contains conductive parts, it is suitable for use as electrode material or other components in a fuel cell.

A further use of the material according to the present invention exists in its use as a catalyst substrate. For this, a defined porosity is created on the surface of the inventive material in its component form in such manner that a stable core remains. For example, when the material consists of silicon carbide as the matrix and coke as the reinforcing element, the surface of the material is oxidized by the action of air, thus creating a defined porosity. The material is then usable, for example, as a filter such as a soot particle filter.

A further use of the inventive material provides for use of the material as a bone replacement material. The material may easily be produced in complex geometries and is thus suitable for creating complex bone structures. The material is also extremely strong and resistant to body fluids. Accordingly, the material lends itself to being implanted directly in a patient's body as bone replacement material of any size and shape. For example, by referring to images that may be generated by a computer tomograph it is possible to manufacture the material in the form of a perfect replica of a missing bone part. Particularly if it has a matrix of silicon carbide and a coke reinforcing element, the material offers the further advantage that it may be oxidized in a controlled manner to produce a desired porosity. The material is therefore suitable for producing a customized support framework for cultivating the body's own bone cells, which is implanted in the body of a patient suffering from bone loss, so that the support framework and the bone are able to fuse via the cultivated bone cells.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
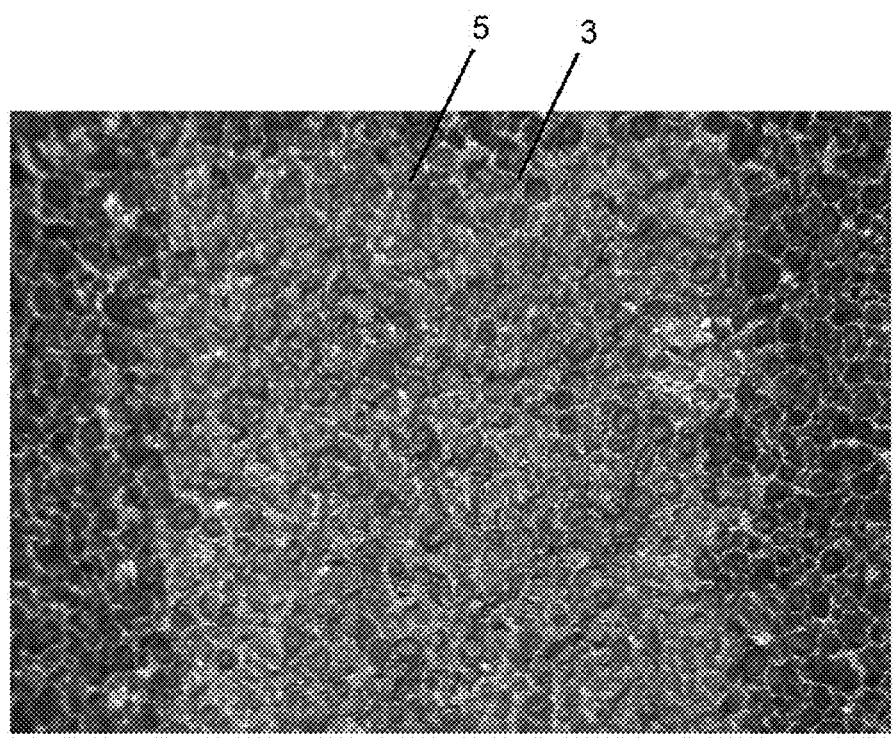
FIG. 1 is an image of a material according to the present invention.

Referring now to the drawings, and more particularly to FIG. 1, there is shown an image of a material according to the present invention. The material includes matrix 3 of silicon carbide and coke 5 as the reinforcing element, though only one of the many reinforcing elements shown in the image is designated with the number 5 for the sake of simplicity. The spherical to ellipsoidal shape of reinforcing element 5 is shown in FIG. 1. FIG. 1 also illustrates that reinforcing element 5, that is to say the coke, perfuses matrix 3, that is to say the silicon carbide. This perfusion is homogeneous.

Figure 2:
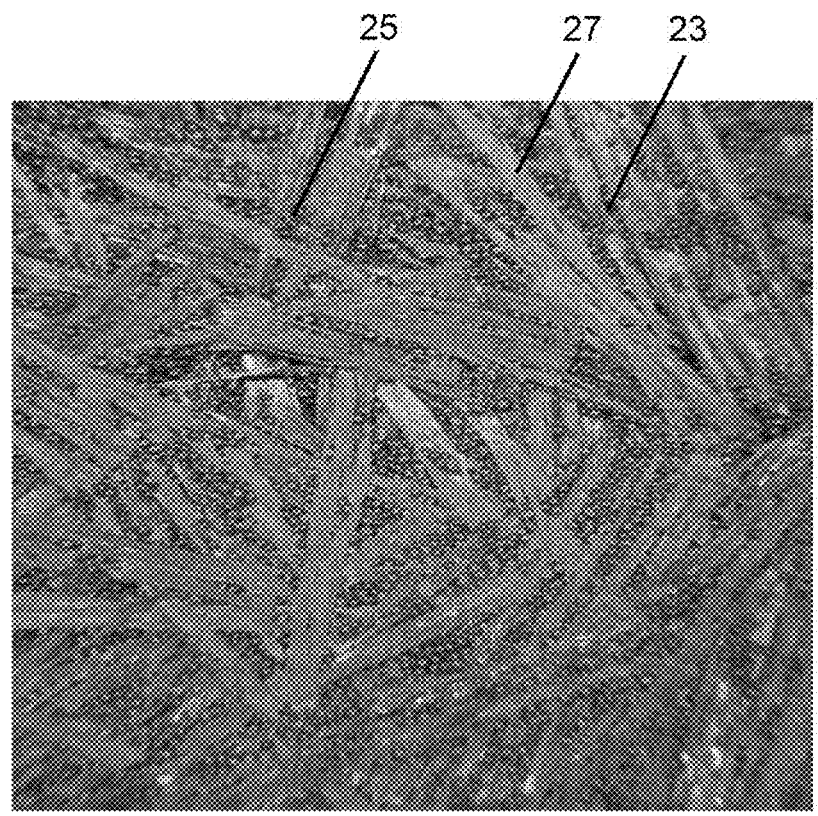
FIG. 2 is another image of a second material according to the present invention.

Referring now to FIG. 2, there is shown an image of another material according to the present invention. The material according to the present invention includes matrix 23 of silicon carbide and coke 25 as the reinforcing element. The material also contains carbon fibers as filler material 27. To simplify the diagram, only one each of the many reinforcing elements and filler materials shown in the image is designated with the numbers 25 and 27 respectively. As is shown in FIG. 2, silicon carbide matrix 23 is perfused with coke spheres as reinforcing elements 25, and carbon fibers as filler materials 27. Here too, the spherical to ellipsoidal shape of reinforcing element 25 is clearly evident.

Additional features and advantages of the invention will now be explained with reference to the examples, without limitation thereto.

Example 1

Production of the Moulding Material

To produce moulded bodies with spherical coke for improved fracture toughness, 1275 g globular coke with granulation of 0-125 μm and 225 g powder resin (SP 227 manufactured by Hexion, Rotterdam, the Netherlands) are mixed vigorously for 2 minutes in a high shear mixer and then fed into a press mould.

Production of the Moulded Body

The mixture then is compacted and cured for 30 minutes in a hot impact extruder at a pressure of 1.5 MPa and a temperature of 160° C., and then demoulded.

Carbonization

The moulded body is heated at a warming rate of 1 K/min to a temperature of 900° C. in an inert gas furnace in a nitrogen atmosphere. This temperature is maintained for one hour. Cooling to room temperature is not controlled.

Siliconization

This moulded body is infiltrated with silicon in a vacuum furnace at temperatures >1500° C. (liquid phase siliconization), wherein some of the carbon formed in the carbonization process reacts with some of the silicon introduced to form silicon carbide. The result is a very strong CSiC component having improved fracture toughness but not containing any fibers. Its properties are summarized in the Table 1 below.

TABLE 1

| Bending Strength [MPa] | E-modulus [GPa] | Elongation [%] | W-break [Nmm] | Density [g/cm$^3$] | CTE 20/200 [μm/mm*K] | Thermal conductivity [W/mK] |
|---|---|---|---|---|---|---|
| 104.2 | 78.3 | 0.13 | 78 | 2.29 | 3.6 | 33.1 |

Example 2

Production of the Moulding Material

To produce moulded material, 1200 g globular coke with granulation of 0-500 μm and 300 g powder resin (SP 227 manufactured by Hexion, Rotterdam, the Netherlands) are premixed for 2 minutes in a high shear mixer and then wetted with 50-60 g of 5% polyvinyl alcohol solution, mixing continuously, and then granulated at speeds of 1200-2000 rpm for 5 minutes with the addition of 30-50 g ethanol. This granulate is then dried at 40-50° C. in a drying cabinet until a residual moisture of 0.5-1.0% is obtained and it may be sieved into various fractions (<1.0 mm, <2.00 mm). This granulate is then fed into a press mould.

Production of the Moulded Body

The mixture is compacted and cured for up to 30 minutes in a hot impact extruder at a pressure of 1-2 MPa and a temperature of 160° C., and then demoulded.

Carbonization

The moulded body is heated at a warming rate of 1 K/min to a temperature of 900° C. in an inert gas furnace in a nitrogen atmosphere. This temperature is maintained for one hour. Cooling to room temperature is not controlled.

Siliconization

This moulded body is infiltrated with silicon in a vacuum furnace at temperatures >1500° C. (liquid phase siliconization), wherein some of the carbon formed in the carbonization process reacts with some of the silicon introduced to form silicon carbide.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A material comprising:
   a matrix selected from a group consisting of at least one of plastic, carbon, ceramic, glass, clay and metal, the material including approximately 10 to 50% by weight of said matrix relative to a total weight of the material; and
   at least one reinforcing element introduced into said matrix and having a spherical to ellipsoidal shape and an onion-skin-like structure, said at least one reinforcing element having been pretreated with an oxidation protection agent, wherein said reinforcing element is coke in spherulitic form and having an onionskin-like structure, the material including approximately 50 to 90% by weight of said reinforcing element relative to said total weight of the material.

2. The material according to claim 1, wherein said coke has a substantially high hardness and is poorly graphitizable and an average inter-layer distance of said onion-like structure of said at least one layer of said reinforcing element after a heat treatment at approximately 2800° C. is at least equal to approximately 0.34 nm at a graphitization degree of at most 46.5% Maire and Mehring.

3. The material according to claim 2, wherein said spherulitic coke includes carbon black.

4. The material according to claim 1, wherein said matrix is silicon carbide.

5. The material according to claim 1, wherein said reinforcing element has a length to diameter ratio of approximately 1 to 10.

6. The material according to claim 1, wherein said reinforcing element has been thermally pretreated.

7. The material according to claim 6, further comprising at least one filler material.

8. The material according to claim 1, wherein a grain size of said reinforcing element is at least approximately 1 μm.

9. The material according to claim 1, wherein the material includes approximately 30 to 95% by weight of said reinforcing element and approximately 5 to 70% by weight of said matrix relative to a total weight of the material.

10. The material according to claim 1, wherein the material includes approximately 60 to 75% by weight of said reinforcing element and approximately 25 to 40% by weight of said matrix relative to said total weight of the material.

11. The material according to claim 10, wherein the material includes up to approximately 40% by weight of a filler material relative to said total weight of the material.

* * * * *